(12) United States Patent
Kim et al.

(10) Patent No.: US 7,612,863 B2
(45) Date of Patent: Nov. 3, 2009

(54) LIQUID CRYSTAL DISPLAY HAVING A DEFECT REPAIR MECHANISM INTERPOSED BETWEEN A LIGHT SHIELDING STORAGE LINE AND A LIGHT SHIELDING OUTPUT ELECTRODE

(75) Inventors: Beom-Jun Kim, Seoul (KR);
Jong-Hwan Lee, Anyang-si (KR);
Sang-Jin Jeon, Suwon-si (KR);
Sung-Man Kim, Seoul (KR); Bong-Jun Lee, Seoul (KR); Hong-Woo Lee, Chungcheongnam-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 60 days.

(21) Appl. No.: 11/744,457

(22) Filed: May 4, 2007

(65) Prior Publication Data
US 2007/0263134 A1    Nov. 15, 2007

(30) Foreign Application Priority Data
May 12, 2006    (KR)    ............................... 2006-43074

(51) Int. Cl.
G02F 1/13    (2006.01)
G02F 1/1343    (2006.01)
G02F 1/1333    (2006.01)
G02F 1/136    (2006.01)
(52) U.S. Cl. ........................... 349/192; 349/38; 349/39; 349/42; 349/44; 349/54; 349/55; 349/111
(58) Field of Classification Search ................... 349/54, 349/55, 192, 43, 44, 111
See application file for complete search history.

(56) References Cited

U.S. PATENT DOCUMENTS

| 6,323,871 | B1 * | 11/2001 | Fujiyoshi et al. | ............. 345/598 |
| 6,621,537 | B1 * | 9/2003 | Nakamura et al. | ............. 349/43 |
| 6,882,375 | B2 * | 4/2005 | Kim | ............................ 349/43 |
| 7,009,664 | B2 * | 3/2006 | Imayama et al. | ............... 349/43 |
| 2004/0114059 | A1 * | 6/2004 | Lee et al. | ....................... 349/39 |
| 2004/0125259 | A1 * | 7/2004 | Cho | ............................ 349/43 |
| 2006/0061700 | A1 * | 3/2006 | Chung et al. | ................... 349/38 |

* cited by examiner

Primary Examiner—Andrew Schechter
Assistant Examiner—Michael Inadomi
(74) Attorney, Agent, or Firm—Innovation Counsel LLP (57) ABSTRACT

A liquid crystal display that is subject to pixel-high defects due to manufacturing anomalies is provided with programmable repair means for each pixel electrode. In one embodiment, a transistor-array substrate is provided with plural gate lines that are separated from each other by a first interval, plural data lines that are insulated from the gate lines while crossing the gate lines, and separated from each other by a second interval larger than the first interval, thereby defining plural pixel areas. Each pixel area has a corresponding pixel unit comprising a switching device, pixel electrode, and repair electrode. The repair electrode branches from a neighboring gate line and extends such that the repair electrode is in overlapping spaced-apart relation with the pixel electrode and selectively connectable to the pixel electrode. Accordingly, a pixel where a high pixel defect occurs can be repaired by selective connection with the repair electrode, thereby improving display quality of the liquid crystal display.

20 Claims, 7 Drawing Sheets

LIQUID CRYSTAL DISPLAY HAVING A DEFECT REPAIR MECHANISM INTERPOSED BETWEEN A LIGHT SHIELDING STORAGE LINE AND A LIGHT SHIELDING OUTPUT ELECTRODE

CROSS-REFERENCE TO RELATED APPLICATION

This application relies for priority upon Korean Patent Application No. 2006-43074 filed on May 12, 2006, the disclosure of which is incorporated herein by reference.

BACKGROUND

1. Field of Invention

The present disclosure of invention relates to liquid crystal displays (LCD's) and more particularly to LCD's which are subject to manufacturing defects that can result in creation of always-on or always-white pixel areas.

2. Description of the Related Art

A typical liquid crystal display (LCD) has a sandwich like structure that includes a transistor-array substrate, a color-filter substrate, and a liquid crystal layer interposed between the transistor-array substrate and the color-filter substrate.

The transistor-array substrate typically includes a plurality of gate lines, a plurality of data lines and a plurality of pixel areas that are defined by intersections the gate lines and the data lines. A plurality of pixel cell units are provided with each pixel unit being disposed in a corresponding pixel area. Each pixel includes a thin film transistor (TFT) and a pixel electrode whose voltage is to be controlled by the TFT connected thereto, assuming the TFT is operational and/or the drive circuitry connected to the TFT is operational.

The color-filter substrate typically includes a color filters layer, such as one having red, green, and blue light emitting filters or filters of other predetermined colors for use with a back-projected source of white light. A common electrode faces the pixel electrodes. The common electrode is formed on the color filters layer.

During manufacturing of the LCD, a defect of the thin film transistor or a defect of interconnect lines to the TFT may occur so as to render the TFT inoperative. Especially, in an LCD of the type where a turned off TFT corresponds with switching its pixel area into a light transmitting or bright white mode, when a defect that renders the thin film transistor inoperative occurs in one pixel unit, the one pixel operates as a unit having its TFT always turned off during displaying an image. As a result, the one pixel is often more whitely displayed than neighboring pixels during displaying of an average image. Such a pixel defect is sometimes called a "high pixel defect". When an LCD has one or more such high pixel defects, the image displaying quality of the liquid crystal display is considered degraded.

SUMMARY

The present disclosure of invention provides a transistor-array containing substrate having a programmable repair mechanism that is capable of improving display quality by repairing selected pixel units where high pixel defects are found to occur.

In one embodiment, a transistor-array substrate includes an insulative base substrate, a plurality of spaced-apart gate lines disposed above the base substrate, a plurality of spaced-apart data lines extending orthogonally to the gate lines and also disposed above the base substrate, and a plurality of pixel units having TFT's operatively coupled to adjoining ones of the gate and data lines.

In one embodiment, the gate lines are provided on or above the base substrate and separated from each other by a first interval, and the data lines are provided on or above the base substrate while remaining insulated from the gate lines at places where the data lines cross with the gate lines. The data lines are spaced from each other by a second interval larger than the first interval, to thereby defining a plurality of pixel areas (PA's). A plurality of pixels aligns correspondingly with respective ones of the pixel areas. Each pixel includes a switching device (e.g., a thin film field effect transistor), a pixel electrode for causing a desired control voltage to appear across an adjacent region of liquid crystal material, and a repair electrode. The switching device is electrically connected to a corresponding gate line and a corresponding data line of the pixel. The pixel electrode is electrically connected to an output electrode (e.g., drain) of the switching device. In one embodiment, the repair electrode branches from the gate line of a next-adjoining pixel area and the repair electrode is positioned such that the repair electrode is in spaced-apart overlapping relation with the pixel electrode of the local pixel area so that the repair electrode can be programmably connected (e.g., via an anti-fuse operation) to the pixel electrode to thereby provide a repair function which drives the pixel electrode in the cell having the defect to the voltage of the gate line, this having the effect of pulsing the driven pixel electrode, each time the display row is addressed, into a state which keeps its pixel area dark rather than whitely lit.

In one embodiment, a liquid crystal display includes a liquid crystal display panel and an electronic driver which drives the liquid crystal display panel. The liquid crystal display panel of the embodiment includes a transistor-array substrate, a color filter substrate disposed in facing opposition to the transistor-array substrate, and a liquid crystal layer interposed between the transistor-array substrate and the color-filter substrate. In this case, the transistor-array substrate includes an insulative base substrate, a plurality of gate lines, a plurality of data lines, and a plurality of pixel units. The gate lines are provided on the base substrate and separated from each other by a first interval. The data lines are provided on the base substrate, insulated from the gate lines while crossing the gate lines, and separated from each other by a second interval greater than the first interval, thereby defining a plurality of pixel areas. A plurality of pixel units aligns correspondingly to the pixel areas.

Each pixel includes a switching device, a pixel electrode, and a repair electrode. The switching device is electrically connected to a corresponding gate line and a corresponding data line. The pixel electrode is electrically connected to an output electrode of the switching device. The repair electrode branches from an adjacent gate line such that the repair electrode is overlapped with the pixel electrode.

According to the above, each pixel unit has a repair electrode branching from a gate line and overlapped with the pixel electrode, so that a turn-off or pulsed repair voltage can be applied to the pixel electrode of a pixel area where a high pixel defect occurs after a repair-activating process is carried out (i.e., by laser activation). Accordingly, the high pixel defect appears to be removed, so the display quality of the liquid crystal display device can be improved.

BRIEF DESCRIPTION OF THE DRAWINGS

The above and other advantages of the present invention will become readily understood by reference to the following detailed description when considered in conjunction with the accompanying drawings wherein.

DETAILED DESCRIPTION

Figure 1:
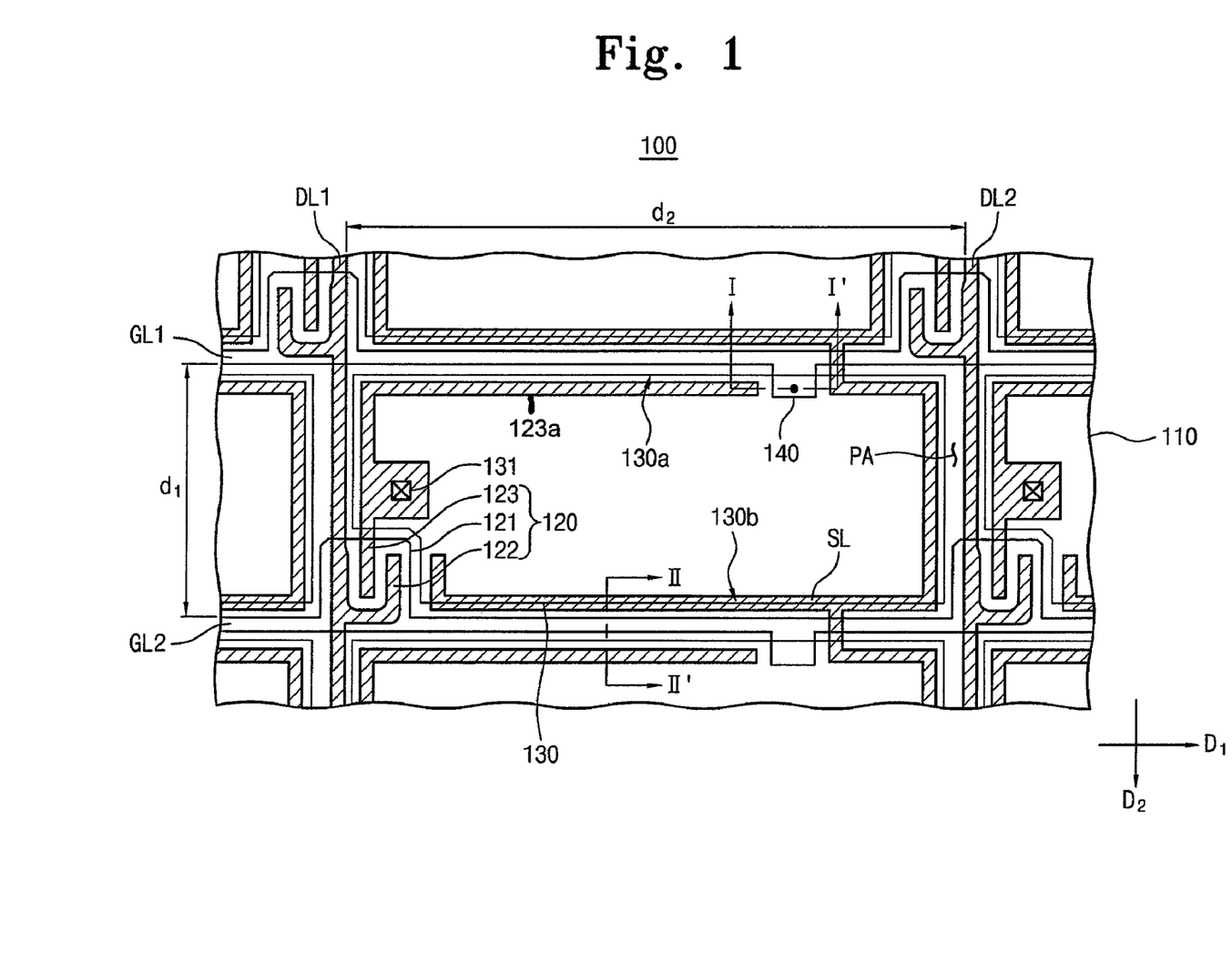
FIG. 1 is a top plan view showing the layout of a pixel area (PA) within a transistor-array substrate of an exemplary embodiment in accordance with the present invention.

FIG. 1 is a layout view showing a transistor-array substrate 100 according to an exemplary embodiment of the present invention. Although the transistor-array substrate 100 includes a plurality of pixels, since each of the pixels has substantially the same structure, detailed description about only one pixel will be made below.

Referring to FIG. 1, the transistor-array substrate 100 includes an insulative base substrate 110, first and second gate lines GL1 and GL2, first and second data lines DL1 and DL2, a thin film transistor (TFT) 120, a pixel electrode 130, a storage line SL, and a repair electrode 140. The first illustrated gate line GL1 is operatively coupled to the gate of the TFT of a next adjacent stage. The second illustrated gate line GL2 is operatively coupled to the gate 121 of TFT 120. The right side data line DL2 is operatively coupled to the source of the TFT in the next adjacent stage. The left side, first data line DL1 is operatively coupled to the source of TFT 120.

The first and second gate lines GL1 and GL2 are provided on the base substrate 110 while extending in a first direction D1. The first and second gate lines GL1 and GL2 are separated from each other by a first interval d1. The first and second data lines DL1 and DL2 are provided on the base substrate 110 while extending in a second direction D2 substantially orthogonal to the first direction D1 such that the first and second data lines DL1 and DL2 are insulated from the first and second gate lines GL1 and GL2 while crossing the first and second gate lines GL1 and GL2. The first and second data lines DL1 and DL2 are separated from each other by a second interval d2 larger than the first interval d1. Accordingly, a pixel area (PA) having a substantially rectangular shape is defined on the transistor-array substrate 100 by the first and second gate lines GL1 and GL2 and the first and second data lines DL1 and DL2, in which the pixel area has a longer lateral side in the first direction D1 as compared to its vertical side. In one embodiment, the ratio of the horizontal to vertical dimensions of the pixel areas is about 3 to 1 so that three such rectangles can be stacked to form a substantially square, super-pixel area. (See for example FIG. 6.)

The thin film transistor 120 formed in the pixel area PA defined by illustrated dimensions d1 (vertical) and d2 (horizontal) has its gate 121 electrically connected to the second gate line GL2 and has its source 122 electrically connected to the first data line DL1. In terms of more detail, the thin film transistor 120 includes a control electrode 121 defining its insulated gate and branching from the second gate line GL2, an input electrode 122 defining its source branching from the first data line DL1, and an output electrode 123 defining its drain as being separated from the source region 122 by a predetermined interval (channel length). Accordingly, the thin film transistor 120 couples a data signal applied to the first data line DL1 to the output electrode 123 in response to an activating gate signal applied to the second gate line GL2.

The pixel electrode 130 is a substantially transparent one provided to extend over substantially the entirety of the subject pixel area PA (d1×d2), and it electrically connects to the output electrode 123 of the thin film transistor 120 by way of via 131. In an embodiment, the pixel electrode 130 includes an Indium Tin Oxide (ITO) or an Indium Zinc Oxide (IZO). The transistor-array substrate 100 further includes an insulative and protection film (not shown) that covers at least the thin film transistor 120 and region I-I' of the corresponding repair electrode 140. The corresponding pixel electrode 130 (whose transparent outline is shown) is provided above the protection film. The protection film is formed with a contact hole or via 131 passing therethrough so as to thereby expose the output electrode 123, and the pixel electrode 130 is electrically connected to the output electrode 123 through the contact hole 131. Accordingly, when there is no pixel high defect present, electrical charge on the pixel electrode 130 is controlled by the data signal that is then output from the output electrode 123 of the corresponding thin film transistor 120.

As shown in FIG. 1, the output electrode 123 of the thin film transistor 120 includes an extension portion 123a that makes a 90 degree turn at the top left corner of the pixel area and then extends along the top long lateral side 130a of the pixel electrode 130 adjacent to the first gate line GL1. The extension portion 123a of the output electrode 123 extending along the first long lateral side 130a is fully covered with the pixel electrode 130. In this embodiment, the output electrode 123 is opaque and thus prevents the leakage of light at an edge portion of the pixel electrode 130, thereby preventing the occurrence of light leakage around an edge portion of the pixel electrode 130. In particular, since the extension portion 123a of the output electrode 123 extends along the first long lateral side 130a, viewing angles of a liquid crystal display employing such an array containing substrate 100 can be improved in upward and downward directions of the liquid crystal display, so the liquid crystal display may have improved display quality.

The storage line SL receives a common voltage, for example a ground voltage, from an external source, and is provided on the base substrate 110 such that the storage line SL is overlapped with an edge portion of the pixel electrode 130. In particular, the storage line SL is partially overlapped with the pixel electrode 130 at a portion adjacent to a second long lateral side 130b of the pixel electrode 130. Accordingly, the grounded storage line SL can reduce parasitic capacitive coupling between the pixel electrode 130 and the second gate line GL2. As a result, the distortion of a voltage signal, which is applied to the pixel electrode 130, derived from the parasitic capacitance can be reduced.

Meanwhile, the repair electrode 140 branches from the first gate line GL1 and so as to be in spaced-apart overlapping or facing relation with the pixel electrode 130. In one embodiment, the gate signal of a previous stage is applied to the first gate line GL1 so as to maintain the level of a pixel-off voltage during a remaining period except for one horizontal scanning period (1H) period during which the TFT of the previous stage is turned on. Accordingly, the repair electrode 140 may maintain the pixel-off voltage level (e.g., equal to or less than −1V in one embodiment) during the remaining period except for the 1H period within each interlaced-rows display frame.

The repair electrode 140 may be used to repair a pixel area (PA) where a high pixel defect occurs and when activated by laser programming or otherwise the repair electrode causes the defective pixel area to behave as an off pixel. That is, when a repair is effectuated, the repair electrode 140 is electrically connected to the pixel electrode 130 of the pixel having the high pixel defect through a repair process such as selectively focusing an irradiating laser beam onto an area formed with the repair electrode 140. Accordingly, the gate signal of the previous stage having the pixel-off voltage level is applied to the pixel electrode 130 of the pixel having the high pixel defect, so that the pixel area having the high pixel defect can be repaired into behaving as an always off pixel area. Thus, the effects of the high pixel defect of the transistor-array substrate 100 can be prevented.

In one embodiment, the repair electrode 140 is interposed between one end part of the extension portion 123*a* of the output electrode 123 and a corner portion of the storage line SL at an edge portion of the pixel electrode 130. The repair electrode 140 has a substantially square shape having an area of 4 µm×4 µm or more.

Figure 2A:
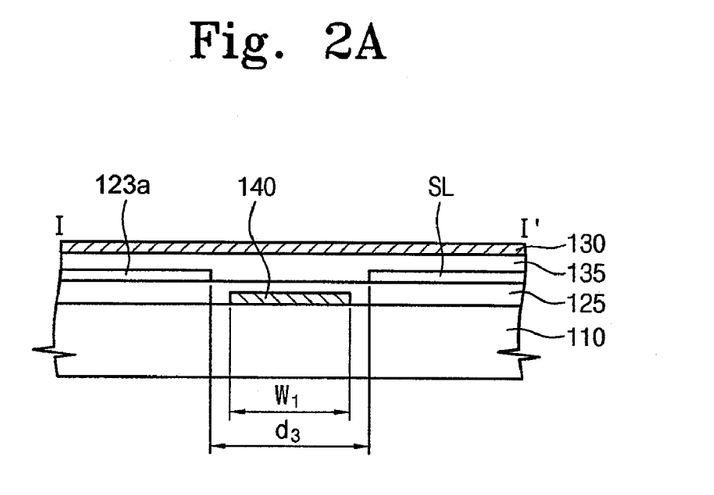
FIG. 2A is a sectional view taken along a line I-I' shown in FIG. 1 before repairing a selected pixel shown in FIG. 1.
Figure 2B:
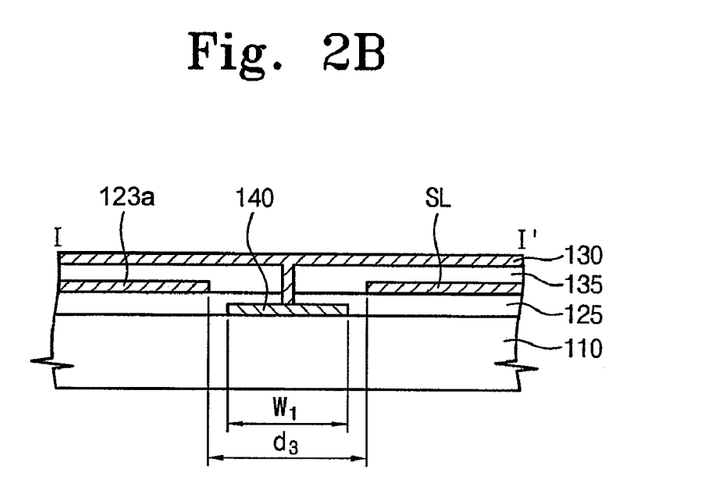
FIG. 2B is a sectional view taken along a line I-I' shown in FIG. 1 after repairing the selected pixel shown in FIG. 1.

FIG. 2A is a sectional view taken along a line I-I' shown in FIG. 1 before repairing a selected pixel shown in FIG. 1. FIG. 2B is a sectional view taken along the line I-I' shown in FIG. 1 after repairing the selected pixel shown in FIG. 1.

Referring to FIGS. 1 and 2A, the base substrate 110 has formed thereon the repair electrode 140 patterned from the gate metal used for the control electrode of the thin film transistor in an adjoining display row. The gate-line insulating layer 125 is formed on the base substrate 110 (i.e., polysilicon and/or glass) on which the repair electrode 140 is formed. Next, the extension portion 123*a* of the output electrode 123 of the thin film transistor and the storage line SL are formed on the gate-line insulating layer 125. The extension portion 123*a* of the output electrode 123 and the storage line SL are patterned on the metal layer of the data-lines, and one end portion of the extension portion 123*a* is spaced apart from one end portion of the storage line SL by a predetermined distance. In the illustrated embodiment, the distance d3 between the end portion of the extension portion 123*a* and the storage line SL is substantially wider than a width W1 of the repair electrode 140.

Thereafter, the penetrable protection film 135 covers the storage line SL and the extension portion 123*a*. The pixel electrode 130 is formed on the protection film 135 with a uniform thickness. The pixel electrode 130 overlaps the repair electrode 140 as well as the storage line SL in the edge portion of the pixel electrode 130. In an embodiment, the penetrable protection film 135 may include a silicon nitride (SiNx) or a silicon Oxide (SiOx).

Referring to FIG. 2B, when a repair is effectuated in the region W1 of the repair electrode, the pixel electrode 130 is electrically connected to the repair electrode 140 that faces the pixel electrode 130 in the pixel having the high pixel defect. That is, if a laser beam of sufficient intensity is irradiated onto an area (W1) in which the repair electrode 140 is formed, the laser causes a hole to be formed through the protection film 135 and through the gate insulating layer 125 at the area onto which the laser is irradiated. The laser also causes localized melting of the metal of the pixel electrode.

As a result, the metal of the pixel electrode 130 fills in the hole and causes the pixel electrode to become electrically connected to the repair electrode 140 arranged in the lower portion of the hole. As a result, a repair voltage presented on the repair electrode 140 is coupled to the pixel electrode. In one embodiment, the gate signal of the previous stage serves as the repair voltage. Since that previous stage has the pixel-off voltage level at the time that the current row is strobed, the pixel-off voltage will be applied to the pixel electrode 130 of the pixel having the high pixel defect through the repair electrode 140.

Therefore, the pixel having the high pixel defect can be repaired to be in the darkened pixel state, to thereby prevent the appearance of an always-lit pixel area due to occurrence of the high pixel defect in that part of the transistor-array substrate 100.

Figure 3:
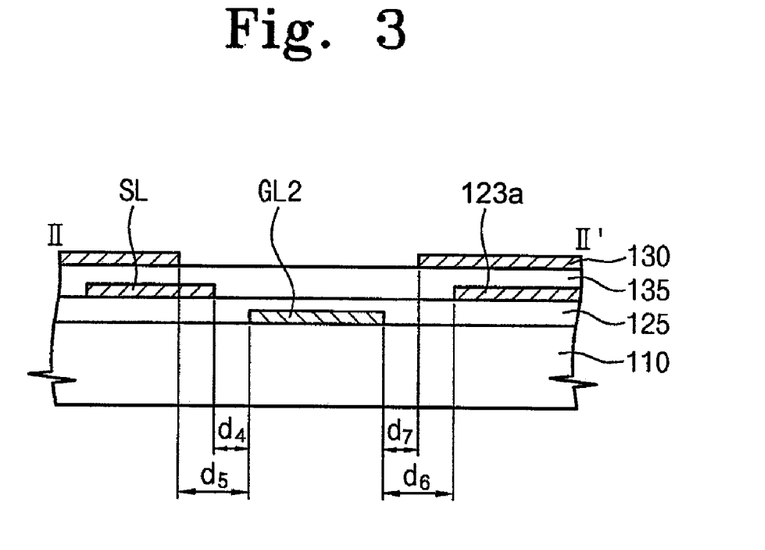
FIG. 3 is a sectional side view taken along a line II-II' shown in FIG. 1.

FIG. 3 is a sectional view taken along a line II-II' shown in FIG. 1.

Referring to FIGS. 1 and 3, the storage line SL provided in a pixel of the present stage is partially overlapped with the pixel electrode 130 provided in the pixel of the present stage. The distance d4 between the second gate line GL2 defining a pixel area of the present stage and the storage line SL of the pixel of the present stage is smaller than the distance d5 between the second gate line GL2 and the pixel electrode 130 of the pixel of the present stage.

In this manner, the storage line SL is positioned closer to but still spaced apart from the second gate line GL2 than is the pixel electrode 130. As a result, a stronger capacitive coupling is effectuated between the steady level (e.g., grounded) SL line and the pixel-electrode 130 than the capacitive coupling present between the fluctuating second gate line GL2 and the pixel-electrode 130. As a result, flickering of the pixel-electrode voltage due to parasitic capacitance created between the pixel electrode 130 and the second gate line GL2 can be reduced.

The extension portion 123*a* of the output electrode 123 of the thin film transistor 120 provided in a pixel of a next stage is fully covered with the pixel electrode 130 provided in the pixel of the next stage. In other words, a distance d6 between the second gate line GL2 and the extension portion 123*a* of the output electrode 123 is longer than a distance d7 between the second gate line GL2 and the pixel electrode 130 of the pixel of the next stage.

As described above, although the extension portion 123*a* of the output electrode 123 extends along the first long lateral side 130*a* of the pixel electrode 130 in order to prevent the light leakage, since the extension portion 123*a* of the output electrode 123 has the same electrical potential as that of the pixel electrode 130, a signal applied to the pixel electrode 130 is not distorted by the presence of the nearby extension portion 123*a*.

Figure 4:
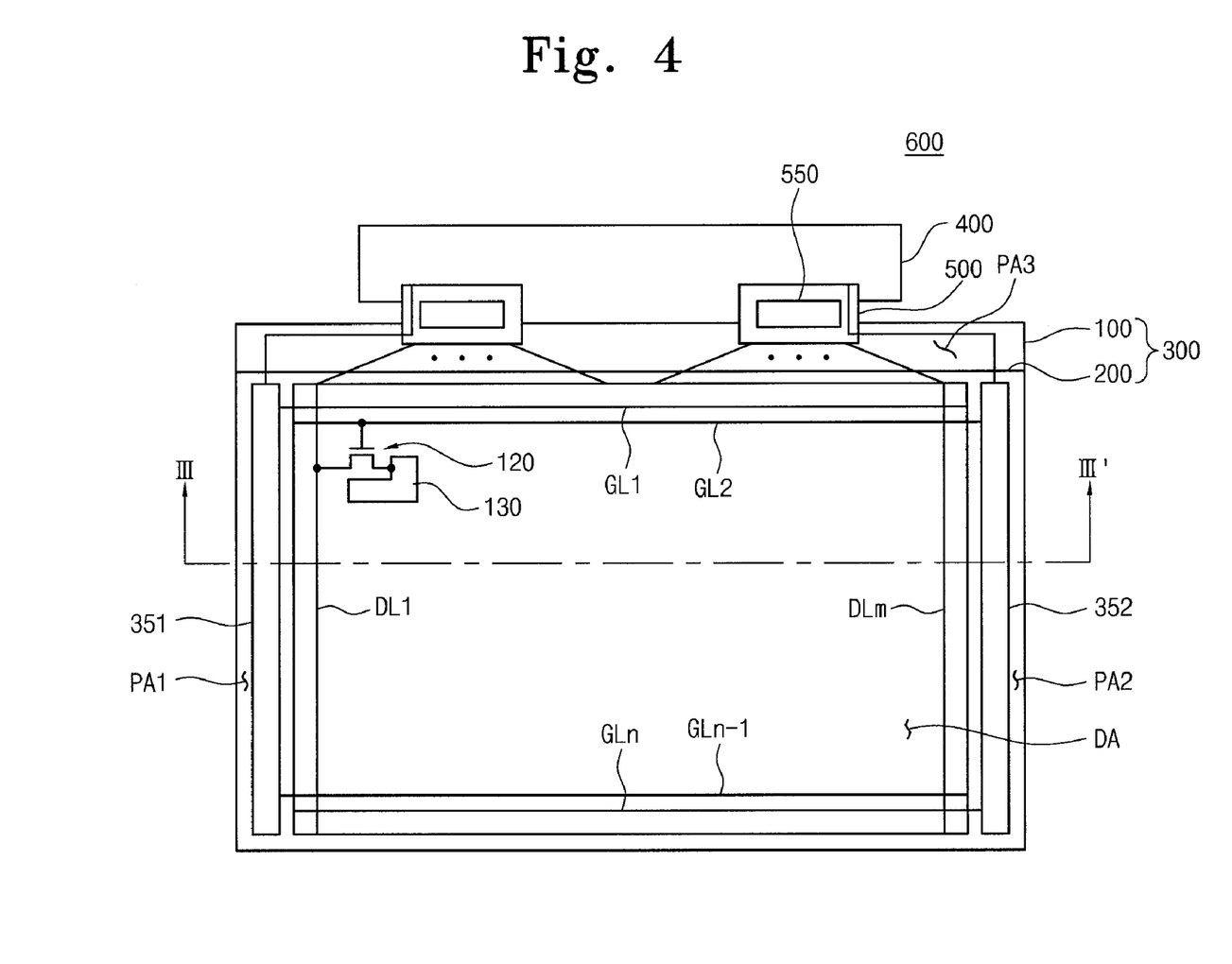
FIG. 4 is a plan view showing a liquid crystal display according to another embodiment of the present invention.
Figure 5:
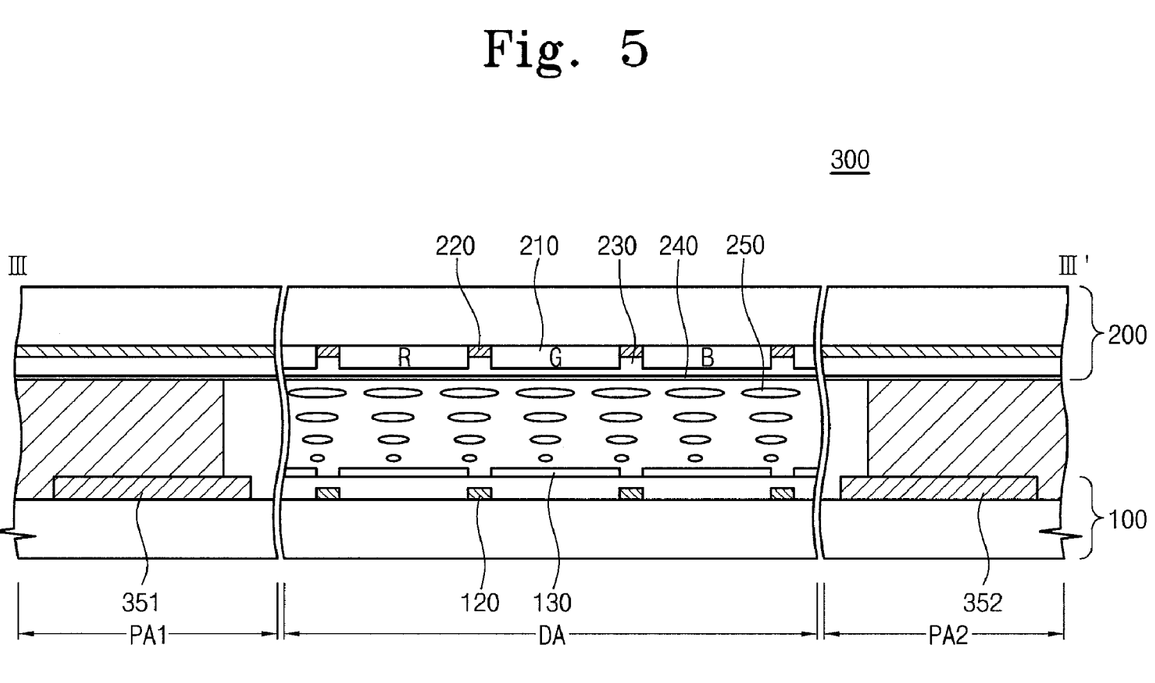
FIG. 5 is a sectional view illustrating a liquid crystal display panel, which is taken along a line III-III' shown in FIG. 4.

FIG. 4 is a plan view showing a liquid crystal display 600 according to another embodiment. FIG. 5 is a sectional view illustrating a liquid crystal display panel, which is taken along a line III-III' shown in FIG. 4.

Referring to FIGS. 4 and 5, the liquid crystal display 600 according to another embodiment includes a liquid crystal display panel 300 displaying an image, a printed circuit board 400 adjacent to the liquid crystal display panel 300, and a flexible tape carrier package 500 electrically connecting the liquid crystal display panel 300 to the printed circuit board 400.

The liquid crystal display panel 300 includes a transistor-array substrate 100, a color-filter substrate 200 opposite to the transistor-array substrate 100, and a liquid crystal layer 250 interposed between the transistor-array substrate 100 and the color filter substrate 200. The transistor-array containing substrate 100 is divided into a display area DA, which displays an image, and first, second, and third peripheral areas PA1, PA2, and PA3 adjacent to the display area DA.

The display area DA of the transistor-array substrate 100 includes a plurality of pixel units arranged in a matrix pattern. In detail, the display area DA includes a plurality of gate lines GL1 to GLn (wherein the n denotes an even number equal to or greater than 2), a plurality of data lines DL1 to DLm, a plurality of thin film transistors 120, and a plurality of pixel electrodes 130.

The first peripheral area PA1 is adjacent to a first end part of the gate lines GL1 to GLn and includes a first gate driving circuit 351 which sequentially applies a first gate signal to odd-numbered gate lines GL1, . . . , GLn−1 among the gate lines GL1 to GLn. The second peripheral area PA2 is adjacent to a second end part of the gate lines GL1 to GLn and includes a second gate driving circuit 352 which sequentially applies a second gate signal to even-numbered gate lines GL2, . . . , GLn among the gate lines GL1 to GLn.

The third peripheral area PA3 is adjacent to one end part of the data lines DL1 to DLm and attached to a first end part of the tape carrier package 500. A second end part of the tape carrier package 500 is attached to the printed circuit board 400. The tape carrier package 500 is equipped with a plurality of data-line driving, integrated circuit chips or circuits 550 providing data signals to the data lines DL1 to DLm. Accordingly, the data driving chip 550 can provide the data signals to the data lines DL1 to DLm in response to various control signals from the printed circuit board 400.

In addition, the first and second gate signals output from the printed circuit board 400 are applied to the first and second gate driving circuits 351 and 352 through the tape carrier package 500, respectively. Accordingly, the first and second gate driving circuits 351 and 352 can provide the first and second gate signals to the odd-numbered and even-numbered gate lines GL1, . . . , GLn−1 and GL2, . . . , GLn in response to the first and second gate signals, respectively.

As shown in FIG. 5, the color-filter substrate 200 includes a color filter layer 210, a black matrix 220, an overcoating layer 230, and a common electrode 240. The color filter layer 210 includes a plurality of color pixels corresponding to pixel electrodes 130. According to one embodiment, the color pixels include red R, green G, and blue B color pixels.

The black matrix 220 is provided between the color pixels so as to define areas in which the color pixels are formed. In addition, the black matrix 220 is formed corresponding to areas of the gate lines GL1 to GLn, the data lines DL1 and DLm, the thin film transistors 120, and the storage line SL formed on the array containing substrate 100. Accordingly, the black matrix 220 actually prevents light leakage in a non-effective display area of the display area DA, in which an image is not actually displayed.

The overcoating layer 230 is formed on the color filter layer 210 and the black matrix 220. Accordingly, the overcoating layer 230 reduces the step difference between the color filter layer 110 and the black matrix 220, thereby planarizing the surface of the color filter containing substrate 200.

The common electrode 240 is formed on the overcoating layer 230 with a uniform thickness such that the common electrode 240 faces the pixel electrodes 130 provided in the transistor-array substrate 100. The liquid crystal layer 250 is interposed between the common electrode 240 and the pixel electrodes 130. Liquid crystal molecules included in the liquid crystal layer 250 may be aligned by an electric field formed between the common electrode 240 and the pixel electrodes 130. The aligned liquid crystal molecules control the transmittance of light supplied from a rear side of the array containing substrate 100, thereby enabling the display of an image on the screen of the liquid crystal display device 600.

Figure 6:
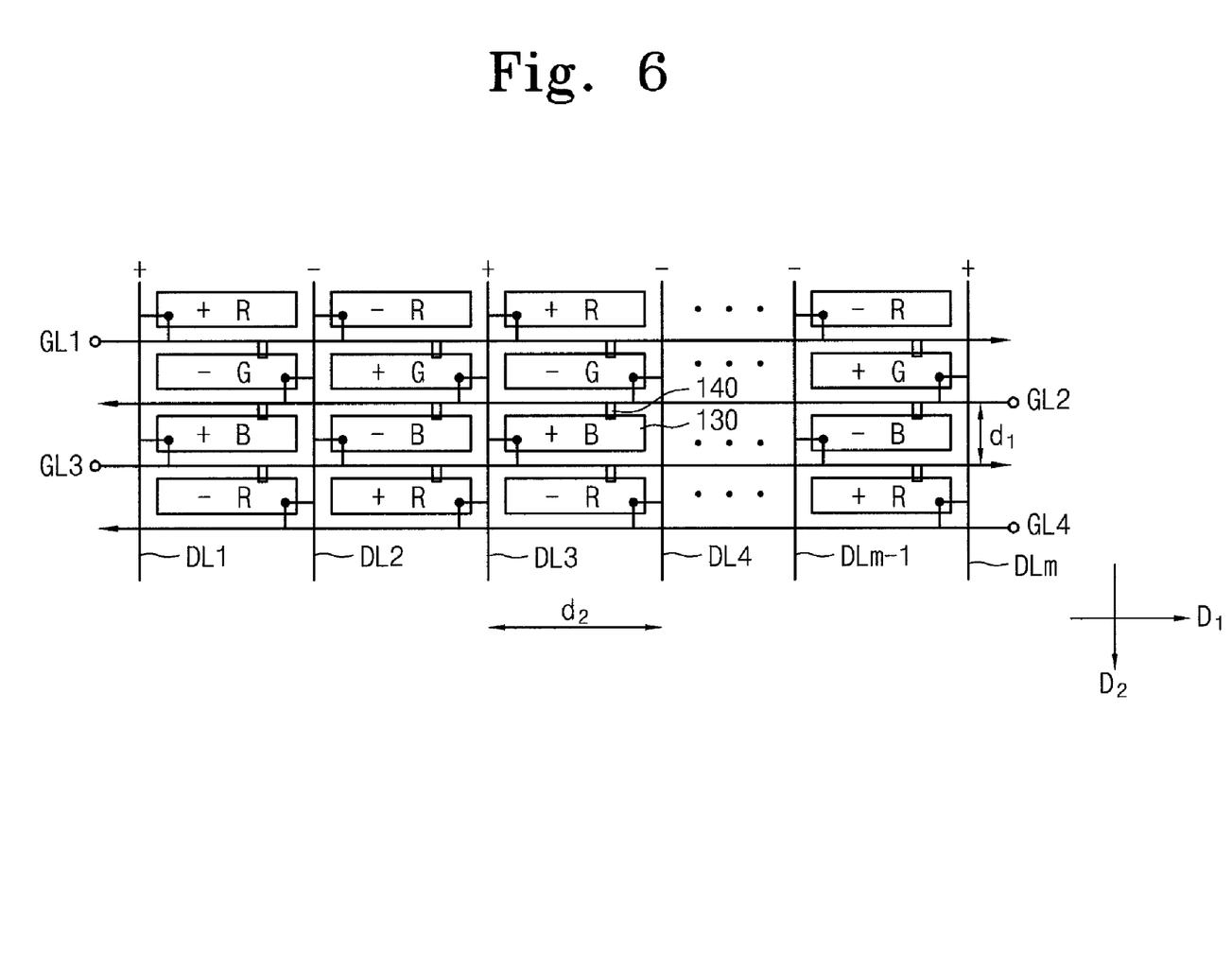
FIG. 6 is a circuit diagram of a transistor-array substrate shown in FIG. 4.

FIG. 6 is a circuit and layout diagram of the array containing substrate 100 shown in FIG. 4.

Referring to FIG. 6, the transistor-array containing substrate 100 includes a plurality of gate lines GL1 to GL4 and a plurality of data lines DL1 to DLm. The transistor-array substrate 100 has a plurality of pixel areas defined thereon in the matrix form by the gate lines GL1 to GL4 and the data lines DL1 to DLm. Each pixel area has a substantially rectangle shape. In other words, a first interval d1 between the gate lines adjacent to each other is narrower than a second interval d2 between the data lines adjacent to each other. As a result, pixel areas having a long lateral side in a first direction D1, rather than a second direction D2, are defined.

According to an embodiment, the second interval d2 has the width about three times wider than the width of the first interval d1. Accordingly, the total number of the gate lines provided in the transistor-array substrate 100 increases by three times as compared with the total number of the data lines. Therefore, the total number of the data lines provided in the transistor-array substrate 100 is reduced by ⅓ as compared with those of the data lines provided in the transistor-array substrate in which the pixel area has a long lateral side in the second direction D2, rather than the first direction D1.

Accordingly, the total number of the data-line driving circuits 550 (see, FIG. 4) needed for providing the data signals to the data lines DL1 to DLm is reduced, so the productivity of the liquid crystal display 600 (see, FIG. 4) can be improved.

Meanwhile, the odd-row thin film transistors 120 connected to the odd-numbered gate lines GL1 and GL3 are electrically connected to left-side data lines, and the even-row thin film transistors 120 connected to the even-numbered gate lines GL2 and GL4 are electrically connected to right-side data lines.

In addition, data signals having different polarities are alternatively applied to the data lines. In other words, if a data signal having a positive polarity (+) is applied to the odd-numbered data line, a data signal having a negative polarity (−) is applied to the even-numbered data line. Thus, the liquid crystal display 600 can operate in a dot inversion driving scheme.

As shown in FIG. 6, pixel electrodes provided in a predetermined pixel row of the present stage are overlapped with repair electrodes branching from gate lines of the previous stage. A common electrode formed at the color filter containing substrate (see, FIG. 4) is overlapped with a predetermined pixel electrode formed at the array containing substrate 100. Due to TFT or other defects, specific pixels (3×3 pixels) may present as a white color, called a high pixel defect. At this time, a repair process, which electrically connects the pixel electrode 130 provided for the specific pixel to the repair electrode 140 overlapped with the pixel electrode 130, is performed, so that a pixel darkening voltage is applied (at least pulse wise) to the pixel electrode 130. Accordingly, the specific pixel can be repaired as an darkened pixel, so the occurrence of the high pixel defect of the array containing substrate 100 can be prevented.

Figure 7:
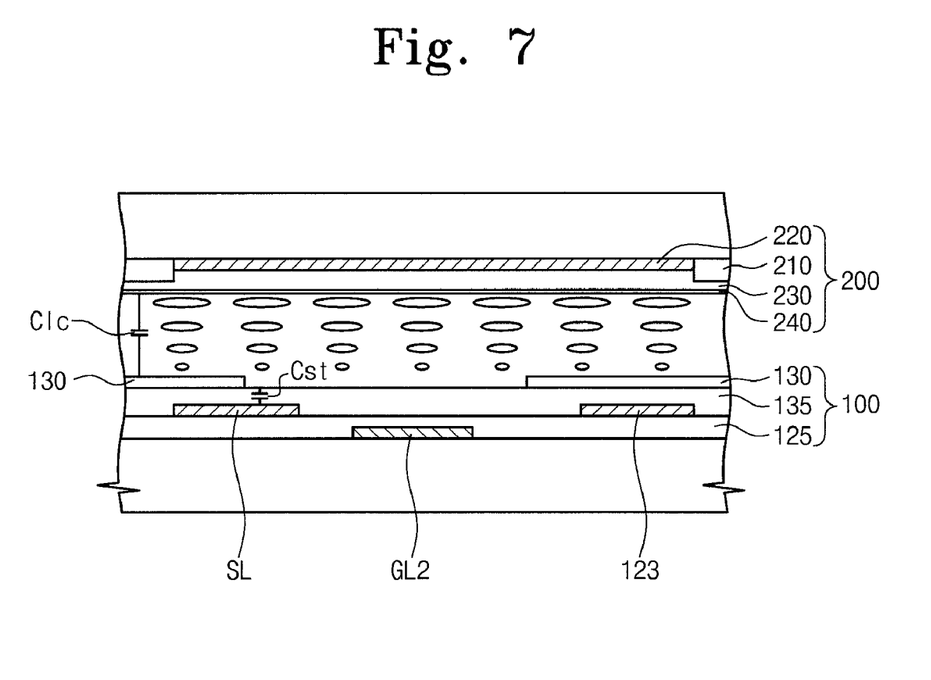
FIG. 7 is a sectional view of a liquid crystal display panel corresponding to a transistor-array substrate shown in FIG. 3.

FIG. 7 is a sectional view of the liquid crystal display panel corresponding to the array containing substrate shown in FIG. 3. In FIG. 7, the same reference numerals denote the same elements in FIG. 3, and thus the detailed descriptions of the same elements will be omitted below in order to avoid redundancy.

Referring to FIG. 7, the liquid crystal display panel 300 includes a liquid crystal capacitor Clc formed by the common electrode 240, the liquid crystal layer 250, and the pixel electrode 130 and a charge storage capacitor Cst formed by the pixel electrode 130, the protection film 135, and the storage line SL. The storage capacitor Cst increases a charge-retaining time of the corresponding pixel-electrode 130 since the effective AC capacitance for the pixel-electrode is the sum of the liquid crystal capacitor Clc and the charge storage capacitor Cst.

The black matrix 220 formed on the color filter containing substrate 200 covers the entire area of the storage line SL, the second gate line GL2, and the output electrode 123 formed on the transistor-array substrate 100. Since the liquid crystal is not normally aligned in the area where the storage line SL, the second gate line GL2, and the output electrode 123 are formed, the light leakage may occur in the above area. However, the black matrix 220 substantially covers the area, thereby preventing the light leakage phenomenon. Accordingly, display quality of the liquid crystal display device 600 (see, FIG. 4) can be improved.

In the embodiments illustrated by FIGS. 1 to 7, the repair electrode 140 branches from the gate line of an adjacent pixel area to thereby provide the repair voltage. However, it is within the contemplation of the disclosure that the repair electrode 140 can instead branch from the storage line SL to thereby provide the repair voltage from the SL line as another embodiment in accordance with the present disclosure of invention.

According to the present disclosure, a transistor-array substrate and liquid display may be provided wherein each pixel area has the repair electrode branching from an adjacent or other gate line and overlapping with the pixel electrode, and the repair electrode receives the pixel darkening voltage supplied from the adjacent or other gate line.

Accordingly, when the pixel electrode of the pixel where the high pixel defect occurs is electrically connected to the repair electrode through the repair process, a pixel darkening voltage can be applied to the defected pixel. As a result, the display quality of a liquid crystal display can be improved by removing the high pixel defect.

Although the exemplary embodiments of the present invention have been described, it is understood that the present invention should not be limited to these exemplary embodiments but various changes and modifications can be made by one ordinary skilled in the art within the spirit and scope of the present invention as here disclosed.

What is claimed is:

1. An array substrate comprising:
    a base substrate;
    a plurality of gate lines provided over the base substrate and separated from each other by a first interval;
    a plurality of data lines provided over the base substrate, insulated from the gate lines while crossing the gate lines, and separated from each other by a second interval larger than the first interval, thereby defining a plurality of pixel areas; and
    a plurality of pixel units aligned correspondingly to the pixel areas,
    each pixel unit comprising:
        a switching device electrically connected to a corresponding present gate line and a corresponding present data line;
        a pixel electrode electrically connected to an output electrode of the switching device;
        a storage line which is provided on the base substrate to receive a common voltage, wherein the storage line is overlapped with an edge portion of the pixel electrode; and
        a repair electrode branching from a previous gate line such that the repair electrode is partially overlapped with the pixel electrode,
    wherein the output electrode comprises an extension portion that extends along at least two lateral sides of the pixel electrode and that is fully overlapped with the pixel electrode and wherein the extension portion of the output electrode is bent in parallel to the present gate line and extends along the edge portion of the pixel electrode so as to be fully overlapped with the pixel electrode,
    and further wherein one end part of the extension portion is separated from the storage line by a predetermined interval at the edge portion, and the repair electrode is interposed between the one end part of the extension portion and the storage line at the edge portion.

2. The array substrate of claim 1, wherein the repair electrode has a substantially square shape having an area of 4 μm×4 μm or more.

3. The array substrate of claim 1, wherein the switching device further includes a control electrode branching from the present gate line and an input electrode branching from the present data line, and the output electrode is provided on a same layer with the input electrode and separated from the input electrode by a predetermined interval.

4. The array substrate of claim 3, wherein the storage line is provided on a same layer with the input and output electrodes of the switching device.

5. The array substrate of claim 1, wherein the pixel electrode includes first and second long lateral sides which extend in an extension direction of the gate lines in parallel to the gate lines.

6. The array substrate of claim 5, wherein a shortest distance measurable between the present gate line adjacent to the first long lateral side and the storage line is smaller than a shortest distance measurable between the present gate line and the pixel electrode and wherein a shortest distance measurable between the previous gate line adjacent to the second long lateral side and the output electrode is larger than a shortest distance measurable between the previous gate line and the pixel electrode.

7. The array substrate of claim 1, further comprising
    a first gate driving circuit, which is formed on the base substrate through a thin film process adjacent to a first end part of the plural gate lines and sequentially applies a first gate signal to odd-numbered gate lines from among the plural gate lines; and
    a second gate driving circuit, which is formed on the array containing substrate through a thin film process in adjacent to a second end part of the plural gate lines and sequentially applies a second gate signal to even-numbered gate lines from among the plural gate lines.

8. A liquid crystal display comprising:
    a liquid crystal display panel including an array substrate, a color filter substrate opposite to the array substrate, and a liquid crystal layer interposed between the array substrate and the color filter substrate; and
    a driver driving the liquid crystal display panel, and
    wherein the array substrate comprises:
        a base substrate;
        a plurality of gate lines provided over the base substrate and separated from each other by a first interval;
        a plurality of data lines provided over the base substrate, insulated from the gate lines while crossing the gate lines, and separated from each other by a second interval larger than the first interval, thereby defining a plurality of pixel areas; and
        a plurality of pixel units aligned correspondingly to the pixel areas, each pixel unit comprising:
  a switching device electrically connected to a corresponding present gate line and a corresponding present data line;
  a pixel electrode electrically connected to an output electrode of the switching device;
  a storage line which is provided on the base substrate and overlapped with an edge part of the pixel electrode to receive a common voltage; and
  a repair electrode branching from a previous gate line such that the repair electrode is partially overlapped with the pixel electrode,
  wherein the output electrode comprises an extension portion that extends along at least two lateral sides of the pixel electrode and that is fully overlapped with the pixel electrode;
  wherein the extension portion of the output electrode of the switching device is bent in parallel to the previous gate line and extends along the edge portion of the pixel electrode so as to be fully overlapped with the pixel electrode, and to be separated from the storage line by a predetermined interval; and
  wherein the repair electrode is interposed between one end part of the extension portion and the storage line at the edge portion of the pixel electrode.

9. The liquid crystal display of claim 8, wherein the driver comprises:
  a first gate driving circuit, which is formed on the base substrate through a thin film process adjacent to a first end part of the plural gate lines and sequentially applies a first gate signal to odd-numbered gate lines from among the plural gate lines;
  a second gate driving circuit, which is formed on the array containing substrate through a thin film process adjacent to a second end part of the plural gate lines and sequentially applies a second gate signal to even-numbered gate lines from among the plural gate lines; and
  a data driving chip operatively coupled to apply data signals to the data lines.

10. The liquid crystal display of claim 9, wherein the driver further comprises:
  a printed circuit board which provides a control signal to the data driving chip and the first and second gate driving circuits; and
  a tape carrier package which is equipped with the data driving chip while electrically connecting the printed circuit board to the liquid crystal display panel.

11. The liquid crystal display of claim 8, wherein the repair electrode has a substantially square shape having an area of 4 μm×4 μm or more.

12. An array substrate comprising:
  a base substrate;
  a plurality of gate lines provided over the base substrate;
  a plurality of data lines provided over the base substrate, insulated from the gate lines while crossing the gate lines thereby defining a plurality of pixel areas; and
  a plurality of pixel units aligned correspondingly to the pixel areas,
  each pixel unit comprising:
  a switching device electrically connected to a corresponding present gate line and a corresponding present data line;
  a pixel electrode electrically connected to an output electrode of the switching device; and
  a storage line which is provided on the base substrate to receive a common voltage and overlapped with an edge portion of the pixel electrode; and
  a repair electrode branching from a previous gate line such that the repair electrode overlaps with the pixel electrode,
  wherein the output electrode comprises an extension portion that extends along the edge portion of the pixel electrode,
  an end part of the extension portion is separated from the storage line by a predetermined interval at the edge portion of the pixel electrode, and the repair electrode is interposed between an end part of the extension portion and the storage line at the edge portion.

13. The array substrate of claim 12, wherein the extension portion is bent in parallel to the previous gate line and fully overlapped with the pixel electrode.

14. The array substrate of claim 12, wherein the gate lines are separated from each other by a first interval, and the data lines are separated from each other by a second interval larger than the first interval.

15. The array substrate of claim 12, wherein the pixel electrode includes first and second long lateral sides which extend in an extension direction of the gate lines in parallel to the gate lines.

16. The array substrate of claim 15, wherein a shortest distance measurable between a present gate line adjacent to the first long lateral side and the storage line is smaller than a shortest distance measurable between the present gate line and the pixel electrode, and a shortest distance measurable between the previous gate line adjacent to the second long lateral side and the extension portion is larger than a shortest distance measurable between the previous gate line and the pixel electrode.

17. An array substrate comprising:
  a light-passing base substrate;
  a plurality of gate lines provided over the base substrate and separated from each other by a first interval;
  a plurality of data lines provided over the base substrate, insulated from the gate lines while crossing the gate lines, and separated from each other by a second interval larger than the first interval, thereby defining a plurality of pixel areas; and
  a plurality of pixel units aligned correspondingly to the pixel areas,
  each pixel unit comprising:
  a switching device having a gate electrode electrically connected to a corresponding first gate line and having a source region electrically connected to a corresponding first data line;
  a pixel electrode electrically connected to an output electrode of the switching device, the pixel electrode having a peripheral boundary including relatively long first and second edges opposed to one another, and substantially shorter third and fourth edges also opposed to one another;
  a light leakage blocking structure disposed substantially along and around the peripheral boundary of the pixel electrode and configured to substantially block light from leaking past the pixel electrode by passing through on an exterior side of the peripheral boundary of the pixel electrode; and
  a repair electrode branching from a second gate line outside of, but adjacent to the pixel unit such that the repair electrode protrudes through the light leakage blocking structure and such that the repair electrode is in spaced-apart overlapping relation with the pixel electrode and selectively connectable to the pixel electrode;
  wherein a first portion of the light leakage blocking structure is defined by a storage line which is provided on the base substrate to receive a common voltage and which is capacitively coupled to the pixel electrode;

wherein the storage line extends substantially along the relatively long second edge of the peripheral boundary of the pixel electrode;

wherein a second portion of the light leakage blocking structure is defined by the output electrode of the switching device extending substantially along the relatively long first edge of the peripheral boundary and extending parallel to the second gate line, the output electrode further bending to substantially extend along the relatively shorter third edge of the pixel electrode peripheral boundary so as to be overlapped with the pixel electrode; and wherein one end part of the output electrode is spaced apart from a neighboring portion of the storage line by a predetermined interval defined along the relatively long first edge of the peripheral boundary and the repair electrode is disposed in a location between the one end part of the output electrode and a spaced apart neighboring portion of the storage line.

18. The array substrate of claim 17, wherein the repair electrode is made of metal and has a substantially square shape.

19. The array substrate of claim 17, wherein the switching device further includes an input electrode branching from the first data line, and wherein the output electrode is provided on a same layer with the input electrode and separated from the input electrode by a predetermined interval.

20. The array substrate of claim 17, wherein a shortest distance measurable between the first gate line adjacent to the relatively long second edge of the peripheral boundary and the storage line is smaller than a shortest distance measurable between the first gate line and the second edge and wherein a shortest distance measurable between the second gate line adjacent to the relatively long first edge of the peripheral boundary and the output electrode is larger than a shortest distance measurable between the second gate line and the first edge.

* * * * *